(12) United States Patent
Balasubramanian et al.

(10) Patent No.: US 10,111,154 B1
(45) Date of Patent: Oct. 23, 2018

(54) CELLULAR BLACKLISTING TECHNIQUES

(71) Applicant: Apple Inc., Cupertino, CA (US)

(72) Inventors: Sundarraman Balasubramanian, Nanterre (FR); Nordine Kadri, Groslay (FR); Omar Ali, Houilles (FR); Vijay Venkataraman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/701,722

(22) Filed: Sep. 12, 2017

(51) Int. Cl.
*H04W 48/02* (2009.01)
*H04W 48/16* (2009.01)

(52) U.S. Cl.
CPC ........... *H04W 48/02* (2013.01); *H04W 48/16* (2013.01)

(58) Field of Classification Search
CPC ............................... H04W 48/02; H04W 48/16
See application file for complete search history.

(56) References Cited

U.S. PATENT DOCUMENTS

| | | | |
|---|---|---|---|
| 7,991,397 B2 | 8/2011 | Willey et al. | |
| 8,843,112 B2 | 9/2014 | Hossain et al. | |
| 9,030,927 B2 | 5/2015 | Mohseni et al. | |
| 9,313,720 B2 | 4/2016 | Balasubramanian et al. | |
| 2009/0253432 A1* | 10/2009 | Willey | H04W 48/02 455/435.2 |
| 2011/0212724 A1* | 9/2011 | Wirtanen | H04W 88/02 455/435.2 |
| 2013/0331101 A1* | 12/2013 | Thomas | H04W 8/18 455/435.1 |

* cited by examiner

*Primary Examiner* — Chuong A Ngo
(74) *Attorney, Agent, or Firm* — Meyertons Hood Kivlin Kowert & Goetzel, P.C.; Jeffrey C. Hood; Michael B. Davis

(57) ABSTRACT

Techniques are disclosed relating to a mobile device blacklisting certain wireless cells. The device may refrain from considering blacklisted cells for cell operations such as reselection and handover. The device may blacklist cells that fail selection criteria or system information decoding. In some embodiments, the device is configured to manage inclusion of cells on the blacklist based on whether the cells are part of a home network (e.g., an HPLMN) for the mobile device. The device may delete cells that are part of the home network from the blacklist after an out-of-service event or may refrain from adding cells from the home network to the blacklist after certain failures, for example. In various embodiments the disclosed techniques may avoid blacklisting desirable cells in certain scenarios while still enabling blacklist functionality. This may improve wireless performance and battery life, for example.

20 Claims, 8 Drawing Sheets

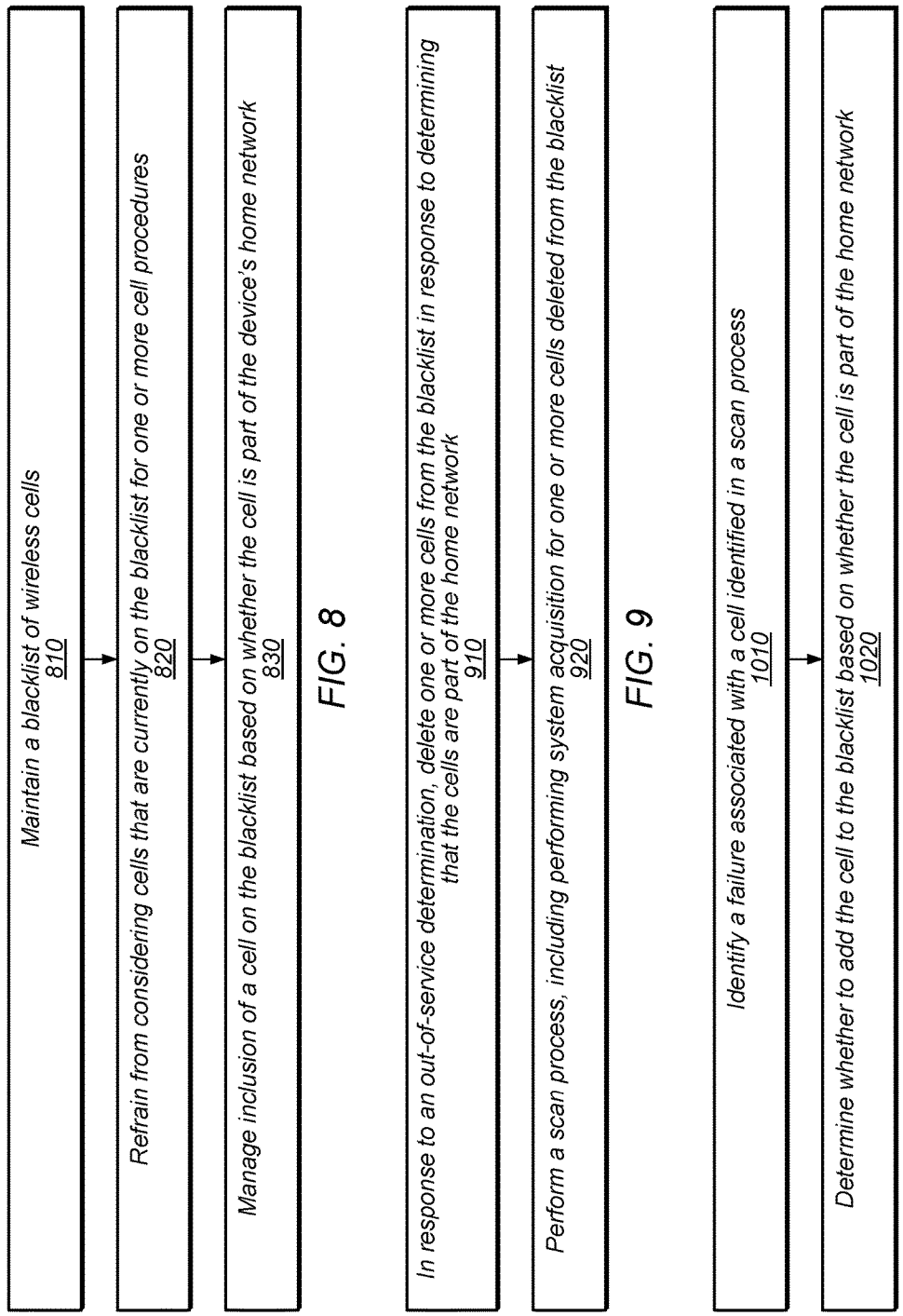

CELLULAR BLACKLISTING TECHNIQUES

BACKGROUND

Technical Field

The present application relates to wireless communications, and more particularly to techniques for a mobile device to determine whether to blacklist certain wireless cells.

Description of the Related Art

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it may be important to also reduce power requirements in UE device designs while allowing the UE device to maintain good transmit and receive abilities for improved communications.

BRIEF DESCRIPTION OF THE DRAWINGS

FIG. 8 is a flow diagram illustrating an exemplary method for managing inclusion of a cell on a blacklist based on whether the cell is part of a device's home network, according to some embodiments.

FIG. 9 is a flow diagram illustrating an exemplary method for deleting one or more cells from a blacklist, according to some embodiments.

FIG. 10 is a flow diagram illustrating an exemplary method for determining whether to add one or more cells to a blacklist, according to some embodiments.

Figure 1:
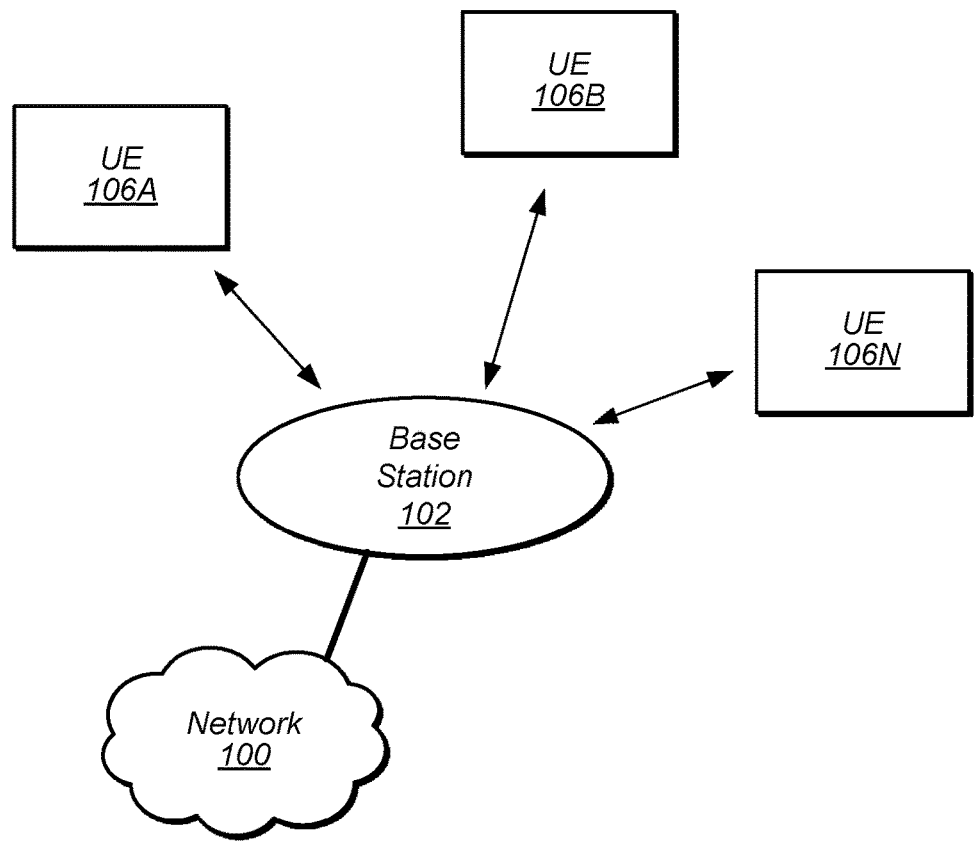
FIG. 1 illustrates an exemplary (and simplified) wireless communication system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first,"

"second," etc. are used as labels for ease of reference in the description and the appended claims.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
ACK: Acknowledgement
APR: Applications Processor
BS: Base Station
BSR: Buffer Size Report
CC: Component Carrier
CMR: Change Mode Request
CQI: Channel Quality Indicator
DL: Downlink (from BS to UE)
DYN: Dynamic
FDD: Frequency Division Duplexing
FT: Frame Type
GPRS: General Packet Radio Service
GSM: Global System for Mobile Communication
HARQ: Hybrid Automatic Repeat Request
IE: Information Element
LAN: Local Area Network
LBT: Listen Before Talk
LTE: Long Term Evolution
LTE-U: LTE in Unlicensed Spectrum
LAA: License Assisted Access
MAC: Medium Access Control (layer)
NACK: Negative Acknowledgement
PCell: Primary Cell
PDCCH: Physical Downlink Control Channel
PDSCH: Physical Downlink Shared Channel
PDN: Packet Data Network
PDU: Protocol Data Unit
PUCCH: Physical Uplink Control Channel
QoS: Quality of Service
RAT: Radio Access Technology
RF: Radio Frequency
RTP: Real-time Transport Protocol
RX: Reception/Receive
SCell: Secondary Cell
TBS: Transport Block Size
TDD: Time Division Duplexing
TTI: Transmission Time Interval
TX: Transmission/Transmit
UCI: Uplink Control Information
UE: User Equipment (Device)
UL: Uplink (from UE to BS)
UMTS: Universal Mobile Telecommunication System
VoLTE: Voice over LTE
WLAN: Wireless LAN
Wi-Fi: Wireless Local Area Network (WLAN) RAT based on the Institute of Electrical and Electronics Engineers' (IEEE) 802.11 standards Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UE devices include mobile telephones or smart phones (e.g., iPhone™, Android™-based phones) and tablet computers such as iPad™ Samsung Galaxy™, etc., portable gaming devices (e.g., Nintendo DS™, PlayStation Portable™, Gameboy Advance™, iPod™), laptops, wearable devices (e.g. Apple Watch™, Google Glass™) PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
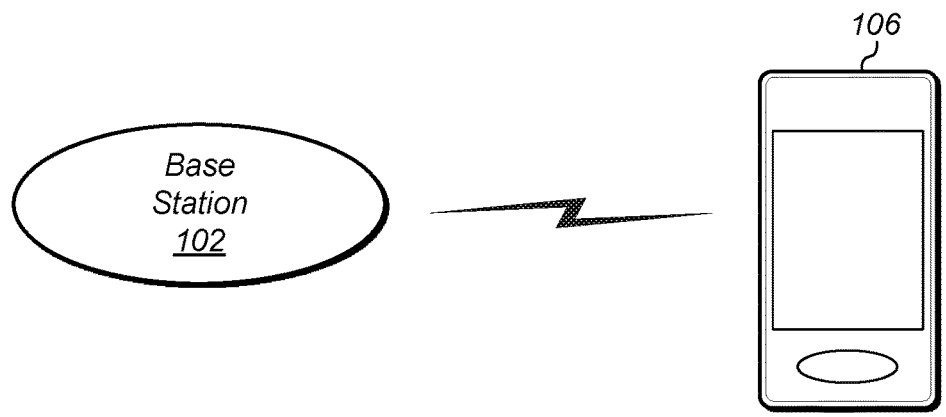
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices. Various ones of the UE devices may operate according to techniques detailed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
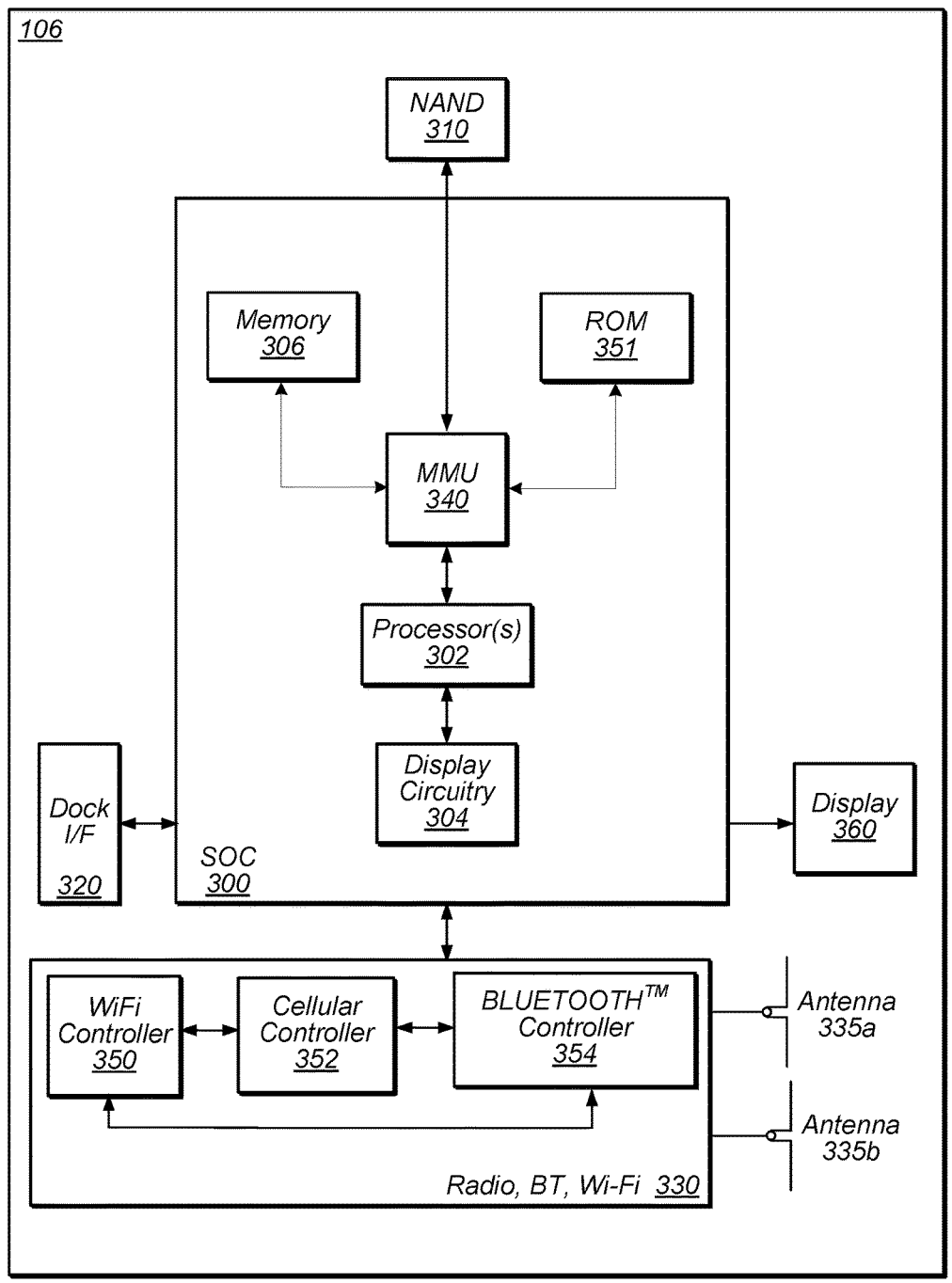
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 351, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate mitigating the potential effects of LAA/LTE imbalance for wireless communications of UE 106, according to various embodiments disclosed herein. Specifically, processor(s) 302 may be coupled to and/or may interoperate with other components as shown in FIG. 3 to facilitate UE 106 communicating in a manner that seeks to minimize imbalance between LAA and LTE communications of UE 106. Processor(s) 302 may also implement various other applications and/or end-user applications running on UE 106.

In some embodiments, radio 330 includes separate controllers dedicated to controlling communications for various respective RAT standards. For example, as shown in FIG. 3, radio 330 may include a Wi-Fi controller 350, a cellular controller (e.g. LTE/3GPP controller) 352, and BLUETOOTH' controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Figure 4:
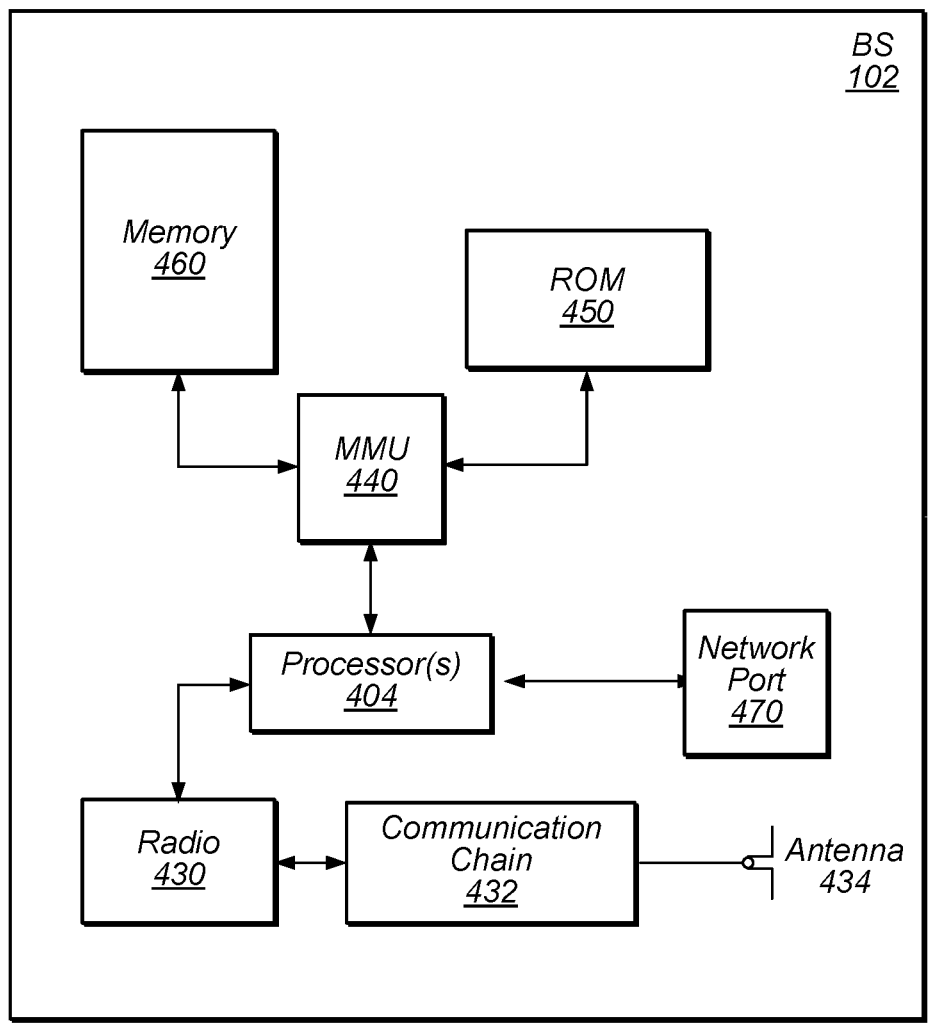
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor 404 of the base station 102 may be configured to implement part or all of the methods described herein, e.g., by executing program instructions stored on a memory medium (e.g., a non-transitory computer-readable memory medium), for base station 102 to communicate with a UE device capable of detecting an imbalance between LAA and LTE communications performed by the UE device, and making adjustments to account for such imbalances. Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices capable of detecting an imbalance between LAA and LTE cellular wireless communications of the mobile devices, and adjusting their wireless operations accordingly, when applicable.

Figure 5:
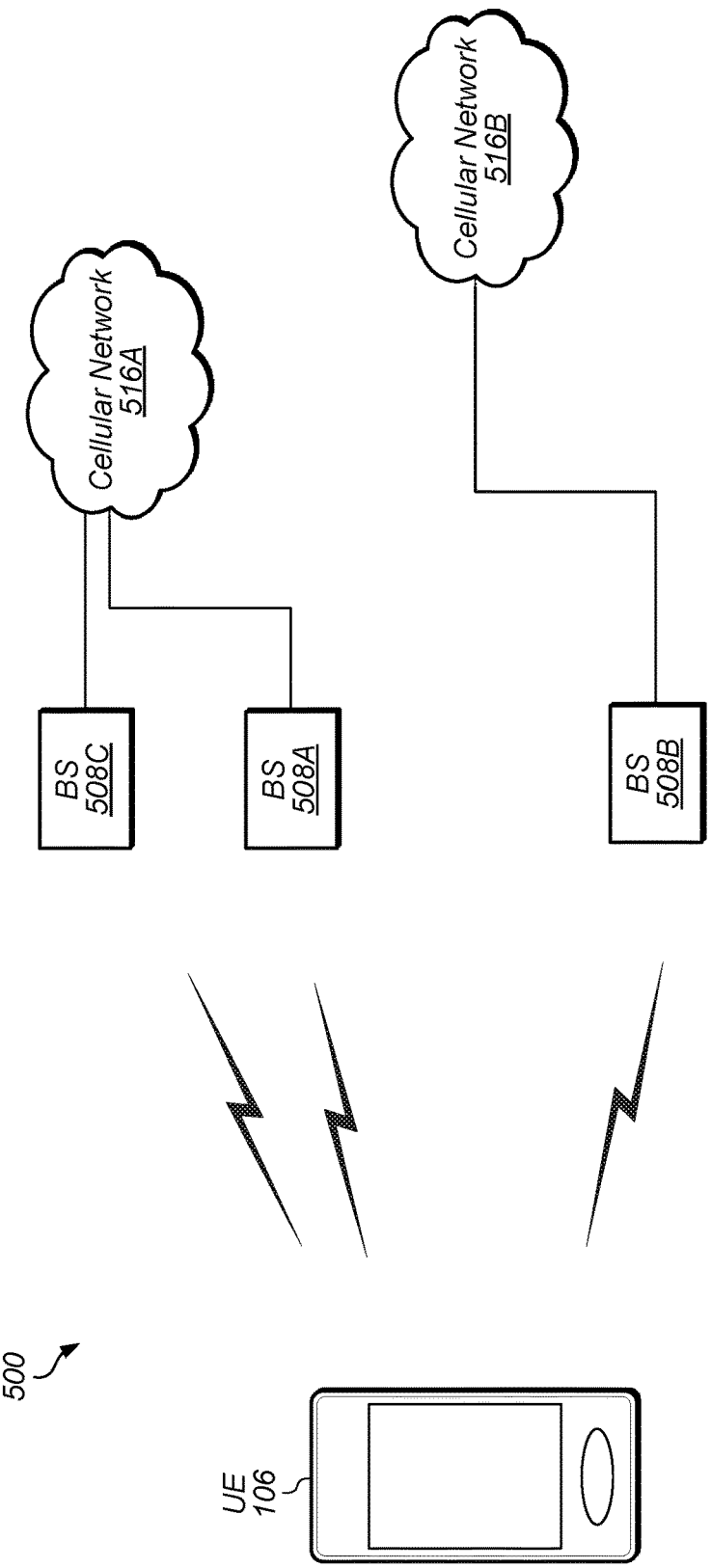
FIG. 5 illustrates an exemplary wireless communication system, according to some embodiments.

FIG. 5—Exemplary Communications with Base Stations of Different PLMNs

FIG. 5 is a block diagram illustrating exemplary communications between a UE 106 and one or more base stations 508. In the illustrated embodiment, UE 106 may communicate with base stations 508A, 508B, and/or 508C, but any of various numbers of base stations that are part of any of various numbers of different cellular networks 516 may be implemented, in various embodiments. In the illustrated embodiment, base stations 508A and 508C are included in cellular network 516A while base station 508B is included in another cellular network 516B.

Each cellular network 516 may correspond to a different public land mobile network (PLMN) and the networks 516 may be operated by different entities. Each PLMN may utilize a radio air interface for communications between mobile devices and base stations and land-based transmissions between base stations and other network elements. In LTE, for example, each PLMN may be identified by a combination of a mobile country code (MCC) and a mobile network code (MNC). Each base station 508 may provide wireless coverage within one or more cells, which may be identified by cell identifiers. UE 106 may select and/or handover between cells based on various parameters such as channel conditions, mobility, etc. The term "PLMN" is used herein to describe exemplary embodiments, but the disclosed techniques are not intended to be limited to communications standards that utilize this term. Rather, similar techniques may be used for different wireless networks in the context of various wireless communications standards.

In some embodiments, one of the cellular networks 516 is a home network for UE 106 (which may be referred to as a home PLMN (HPLMN) in some communications standards) while one or more other cellular networks 516 are not home networks (e.g., they may be visitor networks such as VPLMNs). In LTE, for example, a network is an HPLMN when its MCC and MNC are the same as the international mobile subscriber identify (IMSI) of the UE 106. Speaking generally, a network may be determined to be a home network by comparing information stored by the UE (e.g., in subscriber identity module (SIM)) with information that identifies the network. Therefore, the home network of a given UE 106 may be changed (e.g., by changing a SIM card or reconfiguring an eSIM).

Thus, UE 106 may be configured to communicate with cells of a home network and cells of one or more other networks. Note that a given cell may be associated with multiple networks or PLMNs. In some embodiments, system information transmitted by a cell (e.g., in SIB-1) specifies one or more cellular networks associated with the cell.

Exemplary Blacklisting Scenarios

In some embodiments, UE 106 is configured to blacklist certain cells in response to one or more events. U.S. Pat. No. 8,744,439, for example, discusses techniques in which a device maintains a blacklist of wireless cells. For example, the '439 patent discusses using the blacklist to indicate base stations that have "previously unexpectedly disconnected" a mobile device.

In some embodiments, UE 106 is configured to blacklist cells for one or more of multiple reasons, including without limitation: system information block (SIB) read failure, selection criteria (S-Criteria) failure, configuration failure, public land mobile network (PLMN) mismatch, forbidden tracking area (TA) failure, closed subscriber group (CSG) check failure, etc. In some embodiments, UE 106 is configured to avoid cells (e.g., by refraining from considering cells on the blacklist for cell reselection or handover) for a pre-determined or configurable time interval after addition to the blacklist. For example, UE 106 is configured not to consider a cell for 5 minutes after blacklisting the cell, using an RRC timer, in some embodiments.

In some embodiments, UE 106 is a link-budget limited device such as a wearable device, a device in a low-power mode, etc. In some embodiments, aggressive blacklist strategies for such devices may result in blacklisting cells that actually become desirable. For example, consider a situation where a device blacklists cell A because of an S-Criteria failure. Due to mobility conditions, cell A may later satisfy the S-criteria (e.g., a minute later). The device avoid cell A, however, until the end of the blacklist interval, even though cell A may be the best cell for the device.

Figure 6:
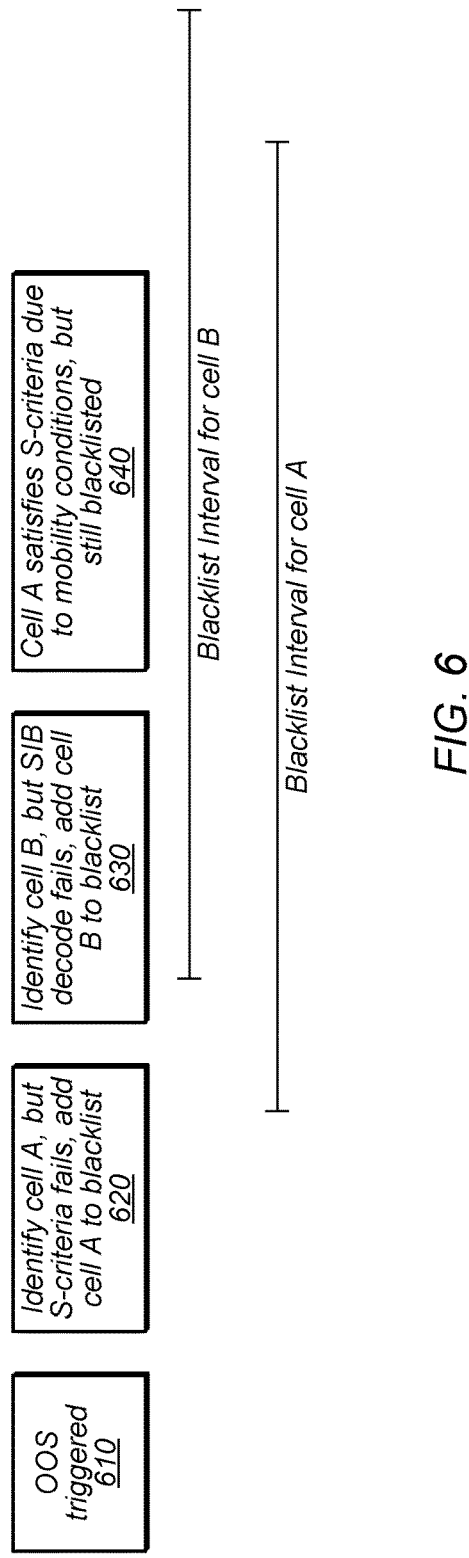
FIG. 6 illustrates an example in which blacklisting causes a mobile device to ignore a cell that has become acceptable.

FIG. 6 is a timing diagram illustrating such an exemplary blacklisting scenario, according to some embodiments. In the illustrated embodiment, an out-of-service (OOS) procedure is triggered during interval 610. Subsequently, e.g. during a scan procedure following OOS, UE 106 identifies cell A, but the selection criteria (S-criteria) cause a failure and UE 106 adds cell A to a blacklist during interval 620. Subsequently, UE 106 identifies cell B, but SIB decode fails and UE 106 adds cell B to the blacklist during interval 630.

Subsequently, in the illustrated example, cell A satisfies S-criteria due to mobile conditions, but remains blacklisted. This may be an undesirable scenario, especially for a link-budget limited device. A similar situation may occur for cell B, e.g., when movement of UE 106 means that it could successfully decode SIBs from cell B, but cell B remains blacklisted.

Therefore, in some embodiments, UE 106 is configured to consider additional criteria when determining whether to blacklist cells. In some embodiments, the disclosed techniques may improve wireless connectivity or performance and/or reduce power consumption.

For example, in some embodiments UE 106 is configured to handle cells differently for blacklisting purposes based on whether the cells are part of a home network (e.g., an HPLMN). For example, UE 106 may remove cells of the HPLMN from a blacklist in certain situations or refrain from adding such cells that are part of the HPLMN to the blacklist. In some embodiments, the UE 106 is also configured to consider a length of time since adding a cell to the blacklist (e.g., when determining whether to remove it) and/or a power measurement for the cell (e.g., received signal strength indicator (RSSI) value).

Exemplary OOS Procedure with Different Handling for HPLMN Cells

Figure 7:
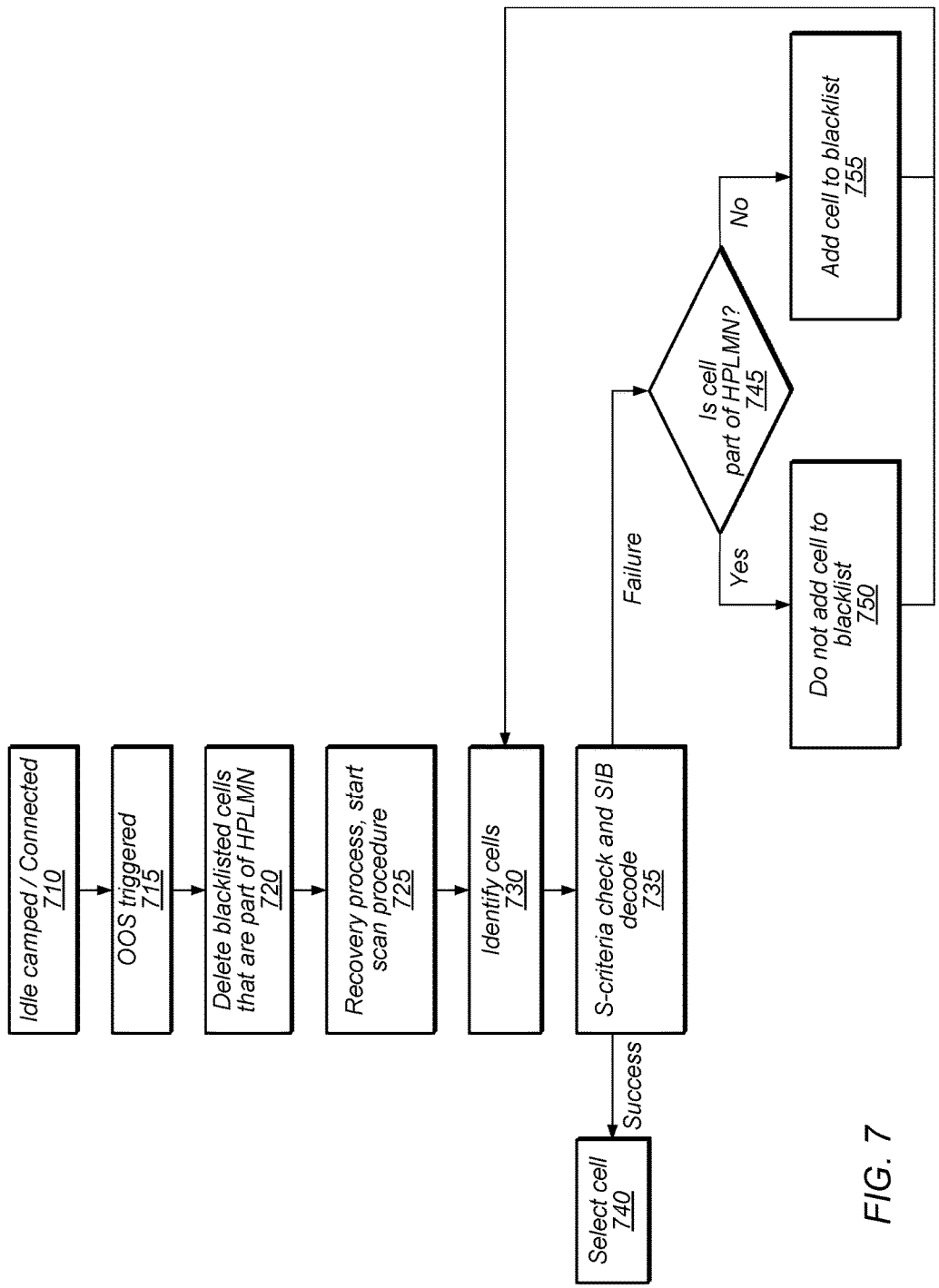
FIG. 7 is a flow diagram illustrating an exemplary blacklisting method, according to some embodiments.

FIG. 7 is a flow diagram illustrating exemplary blacklisting techniques, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, UE 106 is in either an idle camped or a connected mode of operation.

At 715, in the illustrated embodiment, an out-of-service (OOS) procedure is triggered for UE 106. For example, the current cell on which UE 106 is camped on or connected to may not fulfil S-Criteria. If UE 106 does not find a suitable neighbor cell for a predefined interval, it may be considered to be "out of service area." The OOS procedure may involve scanning for other cells, determining measurements for neighboring cells, etc., as discussed below with reference to element 725.

At 720, in the illustrated embodiment, UE 106 deletes cells from the blacklist that are part of the HPLMN. These cells may have previously been blacklisted for various reasons different reasons. Removing them from the blacklist in response to an OOS situation, however, may improve UE 106's ability to recover from the OOS situation.

In some embodiments, UE 106 is configured to remove HPLMN cells from the blacklist at element 720 only if the cells have already resided on the blacklist for a threshold time interval. Thus, UE 106 may leave HPLMN cells on the blacklist that were recently added, e.g., because it is unlikely that those cells will have become suitable in a short interval. In these embodiments, UE 106 may include a timer to determine an interval that has passed since addition of a cell to the blacklist. In some embodiments, UE 106 may store an indicator that indicates that cells were recently added to the blacklist and periodically clear the indicator for all cells currently on the blacklist. In other embodiments, any of various appropriate techniques may be used to track the amount of time that has passed since blacklisting a cell.

At 725, in the illustrated embodiment, UE 106 starts a scan procedure as part of a recovery process to determine suitable cells. Because of the deletion performed in element 720, a greater number of HPLMN cells may be available for this scan than if element 720 were omitted, which may allow UE 106 to recover more quickly if these cells are suitable.

At 730, in the illustrated embodiment, UE 106 identifies one or more cells.

At 735, in the illustrated embodiment, UE 106 checks S-criteria and attempts to decode one or more SIBs for the cells identified in element 730. If the S-criteria check and SIB decode succeeds for a cell, flow proceeds to 740 and UE 106 selects the cell. If the S-criteria check or SIB decode fails for a cell, flow proceeds to 745.

At 745, in the illustrated embodiment, UE 106 determines whether the identified cell that failed is part of the HPLMN. If the cell is not part of the HPLMN, flow proceeds to 755 and UE 106 adds the cell to the blacklist. If the cell is part of the HPLMN, flow proceeds to 750 and UE 106 does not add the cell to the blacklist.

In some embodiments, UE 106 may also configured to consider signal power for method elements 720 and/or 750. For example, UE 106 may determine RSSI for a cell that is part of the HPLMN. If the RSSI is below a threshold value, UE 106 may leave the cell on the blacklist at element 720 or delete the cell from the blacklist at element 750. This may prevent very weak HPLMN cells from avoiding the blacklist, in some embodiments.

The disclosed techniques may be particularly effective for link-budget limited devices because a blacklist is still implemented, but potentially-desirable HPLMN cells are relegated to the blacklist less often, relative to blacklisting techniques that do not distinguish between different types of cells.

Exemplary Methods

FIG. 8 is another flow diagram illustrating exemplary blacklisting techniques, according to some embodiments. The method shown in FIG. 8 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, a mobile device (e.g., UE 106) maintains a blacklist of wireless cells. For example, the blacklist may specify a cell identifier for each listed cell. The blacklist may be organized using any of various appropriate data structures, including an array, linked list, vector, database etc.

At 820, in the illustrated embodiment, the mobile device refrains from considering cells that are currently on the blacklist for one or more cell procedures for the mobile device. For example, the mobile device may refrain from considering cells on the blacklist for cell reselection or handover. This may prevent the mobile device from camping on cells on the blacklist. The mobile device may remove cells from the blacklist a threshold time interval (e.g., 5 minutes) after respective cells are added. The mobile device may include one or more timers used to count ones of the various threshold time intervals discussed herein.

At 830, in the illustrated embodiment, the mobile device manages inclusion of the cell on the blacklist based on whether the cell is part of the device's home network. For example, the mobile device may determine whether to delete a cell from the blacklist or add the cell to the blacklist, in various scenarios, based at least in part on whether the cell is part of the device's home network. In various embodiments, "managing" inclusion of a cell on a blacklist may include, without limitation: removing a cell from the blacklist, adding a cell to the blacklist, refraining from adding a cell to the blacklist in certain scenarios, or adjusting an amount of time in which a cell will stay on the blacklist.

FIG. 9 is flow diagram illustrating exemplary techniques for deleting one or more cells from a blacklist, according to some embodiments. The method shown in FIG. 9 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 910, in the illustrated embodiment, a mobile device, in response to an out-of-service determination, deletes one or more cells from the blacklist in response to determining that the cells are part of the home network.

As discussed above, the mobile device may not delete a cell from the blacklist that is determined to be part of the home network in response to determining that the cell was added to the blacklist within a threshold time interval (e.g., 30 seconds). Further, the mobile device may not delete a cell from the blacklist that is determined to be part of the home network in response to determining that a received signal strength indicator (RSSI) for the cell is below a threshold value.

At 920, in the illustrated embodiment, the mobile device performs a scan process that includes performing system acquisition for one or more cells deleted from the blacklist.

In some embodiments, the method of FIG. 9 is included in element 830 of FIG. 8.

FIG. 10 is flow diagram illustrating exemplary techniques for determining whether to add a failing cell to a blacklist, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, the mobile device identifies a failure associated with a cell identified in a scan process. The scan process may be performed following an OOS trigger. The failure associated with the cell may be a failure to decode system information from the cell or a failure of the cell to satisfy cell selection criteria, for example.

At 1020, in the illustrated embodiment, the mobile device determines whether to add the cell to the blacklist based on whether the cell is part of the home network. For example, the mobile device may add the cell to the blacklist when it is not part of the home network or refrain from adding the cell to the blacklist when it is part of the home network. In some embodiments, the mobile device may add a cell to the blacklist, even if the cell is part of the home network, in response to determining that a received signal strength indicator (RSSI) for the cell is below a threshold value.

In some embodiments, the method of FIG. 10 is included in element 830 of FIG. 8.

In various embodiments, the disclosed techniques may advantageously reduce recovery times from OOS, reduce overall battery consumption, increase communications via a home network, etc.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 11B:
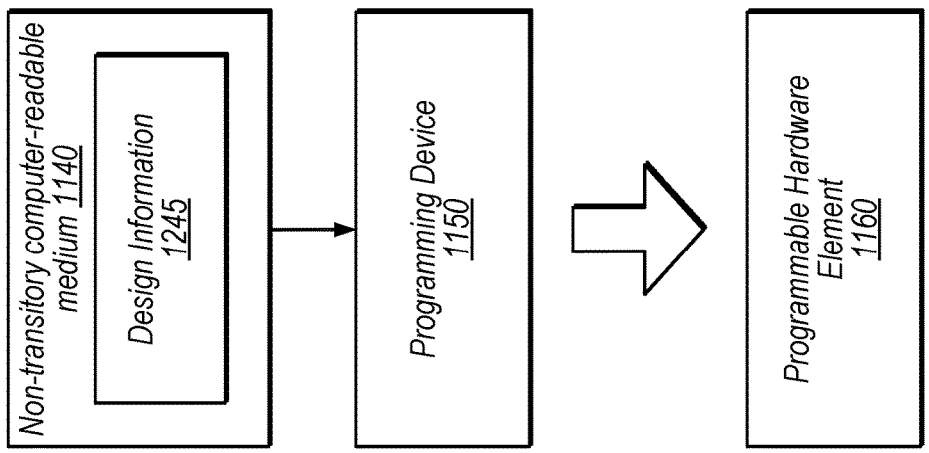
FIGS. 11A and 11B are diagrams illustrating exemplary computer readable media, according to some embodiments.
Figure 11A:
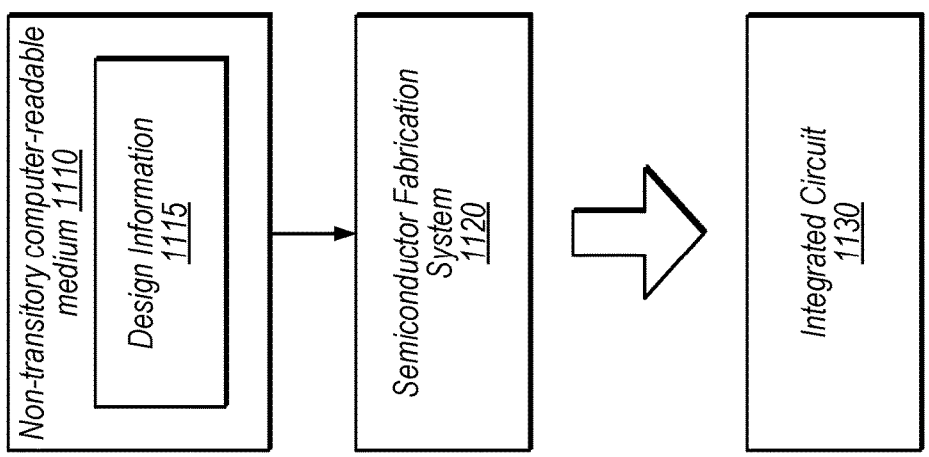

FIG. 11A is a block diagram illustrating an exemplary non-transitory computer-readable storage medium that stores circuit design information, according to some embodiments. In the illustrated embodiment semiconductor fabrication system 1120 is configured to process the design information 1115 stored on non-transitory computer-readable medium 1110 and fabricate integrated circuit 1130 based on the design information 1115.

Non-transitory computer-readable medium 1110, may comprise any of various appropriate types of memory devices or storage devices. Medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 1110 may include other types of non-transitory memory as well or combinations thereof. Medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabrication at least a portion of integrated circuit 1130. The format of design information 1115 may be recognized by at least one semiconductor fabrication system 1120. In some embodiments, design information 1115 may also include one or more cell libraries which specify the synthesis and/or layout of integrated circuit 1130. In some embodiments, the design information is specified in whole or in part in the form of a netlist that specifies cell library elements and their connectivity.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown herein. Further, integrated circuit 1130 may be configured to perform various functions described herein in conjunction with other components. Further, the functionality described herein may be performed by multiple connected integrated circuits.

FIG. 11B is a block diagram illustrating an exemplary non-transitory computer-readable storage medium that stores design information for a programmable hardware element, according to some embodiments. In the illustrated embodiment programming device 1150 is configured to process the design information 1145 stored on non-transitory computer-readable medium 1140 and program programmable hardware element 1160 based on the design information 1145.

Medium 1140 and design information 1145 may have features similar to medium 1110 and design information 1115, as discussed above. Hardware description languages used to design ASICs may be similar or different than those used to program programmable hardware elements. Programmable hardware element 1160 may be a field-programmable gate array (FPGA), programmable logic array (PLA), complex programmable logic device (CPLD) etc. Programmable hardware element 1160 may include logic blocks, hard blocks for common functions, configurable clocking structures, memories, fuses, etc. A given programmable hardware element 1160 may be programmed differently at different times, e.g., by adjusting the functionality of the logic blocks, interconnections between circuit elements, etc.

In various embodiments, programmable hardware element 1160 is configured, after being programmed, to operate according to the circuit design specified by design information 1145, which may include performing any of the functionality described herein. For example, programmable hardware element 1160 may implement any of various elements shown herein. Further, programmable hardware element 1160 may be configured to perform various functions described herein in conjunction with other components. Further, the functionality described herein may be performed by multiple connected programmable hardware elements.

As used herein, the term "implement the circuit according to the design" includes both fabricating an integrated circuit according to the design and programming a programmable hardware element according to the design. Semiconductor fabrication system 1120 and programming device 1150 are examples of computing systems configured to implement circuits according to design information. Speaking generally, implementing a circuit according to a design may include other ways to implement hardware circuits in addition to the techniques discussed with references to FIGS. 11A and 11B. This term is intended to cover all such techniques for implementing hardware circuits according to design information stored in a computer-readable medium.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In various embodiments, the design information may specify the configurations of circuit elements of various embodiments described herein, including FIGS. 1-5, for example.

Embodiments of the present disclosure may be realized in any of various forms. For example, in some embodiments, the present disclosure may be realized as a computer-implemented method, a computer-readable memory medium, or a computer system. In other embodiments, the present disclosure may be realized using one or more custom-designed hardware devices such as ASICs. In other embodiments, the present disclosure may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
one or more processors configured to:
store a blacklist of wireless cells using one or more storage elements of the apparatus, wherein the apparatus is configured not to consider cells on the blacklist for one or more cell procedures for the apparatus, wherein during one or more time intervals, the blacklist includes both a wireless cell of a home cellular network of the apparatus and a wireless cell of one or more non-home cellular networks on which the apparatus is configured to communicate; and
in response to a cellular event, delete a first cell on the blacklist based on determining that the first cell is part of the home network of the apparatus and refrain from deleting a second cell on the blacklist based on determining that the second cell is part of a non-home cellular network.

2. The apparatus of claim 1, wherein the cellular event is an out-of-service determination; and
wherein the one or more processors are further configured to perform a scan process, including performing system acquisition for one or more cells deleted from the blacklist.

3. The apparatus of claim 2, wherein, in response to the out-of-service determination, the apparatus is configured not to delete a cell from the blacklist that is determined to be part of the home network in response to determining that the cell was added to the blacklist within a threshold time interval.

4. The apparatus of claim 2, wherein, in response to the out-of-service determination, the apparatus is configured not to delete a cell from the blacklist that is determined to be part of the home network in response to determining that a received signal strength indicator (RSSI) for the cell is below a threshold value.

5. The apparatus of claim 1,
wherein, in response to a failure associated with cells identified in a scan process, the one or more processors are further configured to refrain from adding a third cell to the blacklist based on determining that the third cell is part of the home network and add a fourth cell to the blacklist based on determining that the fourth cell is part of a non-home network.

6. The apparatus of claim 5, wherein the apparatus is configured to add a cell to the blacklist that is part of the home network in response to determining that a received signal strength indicator (RSSI) for the cell is below a threshold value.

7. The apparatus of claim 5, wherein the failure associated with the cell is a failure to decode system information from the cell or a failure of the cell to satisfy cell selection criteria.

8. The apparatus of claim 1, wherein the one or more cell procedures for which the apparatus is configured not to consider cells on the blacklist include: cell reselection procedures and handover procedures.

9. The apparatus of claim 1, wherein the apparatus is configured to remove cells from the blacklist a threshold time interval after adding respective cells to the blacklist.

10. The apparatus of claim 1, wherein the home network is a home public land mobile network (HPLMN) of the apparatus.

11. A method, comprising:
storing, by a mobile device, a blacklist of wireless cells;
refraining, by the mobile device, from performing one or more cell procedures for cells on the blacklist wherein during one or more time intervals, the blacklist includes both a wireless cell of a home cellular network of the mobile device and a wireless cell of one or more non-home cellular networks on which the mobile device communicates; and
in response to a cellular event, deleting, by the mobile device, a first cell on the blacklist based on determining that the cell is part of the home network of the mobile device and refraining from deleting a second cell on the blacklist based on determining that the second cell is part of a non-home cellular network.

12. The method of claim 11, wherein the cellular event is an out-of-service determination; and
performing a scan process, including performing system acquisition for one or more cells deleted from the blacklist.

13. The method of claim 12, further comprising:
leaving a cell on the blacklist that is determined to be part of the home network in response to determining that the cell was added to the blacklist within a threshold time interval.

14. The method of claim 11, further comprising, in response to a failure associated with cells identified in a scan process, determining to refrain from adding a third cell to the blacklist based on determining that the third cell is part of the home network and to add a fourth cell to the blacklist based on determining that the fourth cell is part of a non-home network.

15. The method of claim 11, wherein the refraining from deleting is further based on a received signal strength indicator (RSSI) for the cell.

16. A non-transitory computer readable storage medium having stored thereon design information that specifies a design of at least a portion of a hardware integrated circuit in a format recognized by a semiconductor fabrication system that is configured to use the design information to produce the circuit according to the design, including:
one or more processors configured to:
store a blacklist of wireless cells, wherein the circuit is configured not to consider cells on the blacklist for one or more cell procedures for the circuit wherein during one or more time intervals, the blacklist includes both a wireless cell of a home cellular network of the circuit and a wireless cell of one or more non-home cellular networks on which the circuit is configured to communicate; and
in response to a cellular event, delete a first cell on the blacklist based on determining that the first cell is part of the home network of the circuit and refrain from deleting a second cell on the blacklist based on determining that the second cell is part of a non-home cellular network.

17. The non-transitory computer readable storage medium of claim 16, wherein the cellular event is
an out-of-service determination; and
wherein the one or more processors are configured to perform a scan process, including performing system acquisition for one or more cells deleted from the blacklist.

18. The non-transitory computer readable storage medium of claim 17, wherein in response to the out-of-service determination the design information specifies that the one or more processors are configured not to delete a cell from the blacklist that is determined to be part of the home network in response to determining that the cell was added to the blacklist within a threshold time interval.

19. The non-transitory computer readable storage medium of claim 16, wherein the design information specifies that the one or more processors are configured to:
in response to a failure associated with cells identified in a scan process, refrain from adding a third cell to the blacklist based on determining that the third cell is part of the home network and add a fourth cell to the blacklist based on determining that the fourth cell is part of a non-home network.

20. The non-transitory computer readable storage medium of claim 16, wherein the one or more processors are further configured to refrain from deleting the first cell from the blacklist based on a received signal strength indicator (RSSI) for the cell.

* * * * *